United States Patent
Beikmann et al.

(10) Patent No.: US 9,599,047 B2
(45) Date of Patent: Mar. 21, 2017

(54) COMBINATION CYLINDER STATE AND TRANSMISSION GEAR CONTROL SYSTEMS AND METHODS

(71) Applicant: GM Global Technology Operations LLC, Detroit, MI (US)

(72) Inventors: Randall S. Beikmann, Brighton, MI (US); Nitish J. Wagh, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 289 days.

(21) Appl. No.: 14/548,501

(22) Filed: Nov. 20, 2014

(65) Prior Publication Data

US 2016/0146138 A1    May 26, 2016

(51) Int. Cl.
   *B60W 10/06*   (2006.01)
   *B60W 10/10*   (2012.01)
   (Continued)

(52) U.S. Cl.
   CPC ......... *F02D 41/0087* (2013.01); *B60W 10/06* (2013.01); *B60W 10/10* (2013.01);
   (Continued)

(58) Field of Classification Search
   None
   See application file for complete search history.

(56) References Cited

U.S. PATENT DOCUMENTS

| 3,596,640 | A | 8/1971 | Bloomfield |
| 4,129,034 | A | 12/1978 | Niles et al. |

(Continued)

FOREIGN PATENT DOCUMENTS

| CN | 1573916 A | 2/2005 |
| CN | 1888407 A | 1/2007 |

(Continued)

OTHER PUBLICATIONS

U.S. Appl. No. 14/734,619, filed Jun. 9, 2015, Matthews.

(Continued)

*Primary Examiner* — Edwin A Young

(57) ABSTRACT

A firing module determines a target number of activated cylinders of an engine based on a torque request and a present gear ratio of a transmission. A combination identification module, based on the torque request, identifies a combination including a possible number of activated cylinders and a possible transmission gear ratio, wherein at least one of: the possible number of activated cylinders is different than the target number of activated cylinders; and the possible transmission gear ratio is different than the present gear ratio of the transmission. A transitioning module, when a second fuel consumption for the possible number of activated cylinders and the possible transmission gear ratio is less than a first fuel consumption for the target number of activated cylinders and the present gear ratio, selectively: transitions the target number of activated cylinders to the possible number of activated cylinders; and transitions a target gear ratio of the transmission to the possible transmission gear ratio. An activation/deactivation module controls cylinder activation and deactivation based on the target number of activated cylinders.

20 Claims, 4 Drawing Sheets

(51) Int. Cl.
*F02D 41/00* (2006.01)
*F02D 41/02* (2006.01)
*F02D 17/02* (2006.01)

(52) U.S. Cl.
CPC .......... *F02D 17/02* (2013.01); *F02D 41/0225* (2013.01); *F02D 2200/0625* (2013.01); *F02D 2200/101* (2013.01)

(56) References Cited

U.S. PATENT DOCUMENTS

| | | | |
|---|---|---|---|
| 4,172,434 A | 10/1979 | Coles | |
| 4,377,997 A | 3/1983 | Staerzl | |
| 4,434,767 A | 3/1984 | Kohama et al. | |
| 4,489,695 A | 12/1984 | Kohama et al. | |
| 4,509,488 A | 4/1985 | Forster et al. | |
| 4,535,744 A | 8/1985 | Matsumura | |
| 4,770,148 A | 9/1988 | Hibino et al. | |
| 4,887,216 A | 12/1989 | Ohnari et al. | |
| 4,974,563 A | 12/1990 | Ikeda et al. | |
| 4,987,888 A | 1/1991 | Funabashi et al. | |
| 5,042,444 A | 8/1991 | Hayes et al. | |
| 5,094,213 A | 3/1992 | Dudek et al. | |
| 5,226,513 A | 7/1993 | Shibayama | |
| 5,278,760 A | 1/1994 | Ribbens et al. | |
| 5,357,932 A | 10/1994 | Clinton et al. | |
| 5,374,224 A | 12/1994 | Huffmaster et al. | |
| 5,377,631 A | 1/1995 | Schechter | |
| 5,423,208 A | 6/1995 | Dudek et al. | |
| 5,465,617 A | 11/1995 | Dudek et al. | |
| 5,496,227 A | 3/1996 | Minowa et al. | |
| 5,540,633 A | 7/1996 | Yamanaka et al. | |
| 5,553,575 A | 9/1996 | Beck et al. | |
| 5,584,266 A | 12/1996 | Motose et al. | |
| 5,669,354 A | 9/1997 | Morris | |
| 5,692,471 A | 12/1997 | Zhang | |
| 5,720,257 A | 2/1998 | Motose et al. | |
| 5,778,858 A | 7/1998 | Garabedian | |
| 5,813,383 A | 9/1998 | Cummings | |
| 5,884,605 A | 3/1999 | Nagaishi et al. | |
| 5,909,720 A | 6/1999 | Yamaoka et al. | |
| 5,931,140 A | 8/1999 | Maloney | |
| 5,934,263 A | 8/1999 | Russ et al. | |
| 5,941,927 A | 8/1999 | Pfitz | |
| 5,974,870 A | 11/1999 | Treinies et al. | |
| 5,975,052 A | 11/1999 | Moyer | |
| 5,983,867 A | 11/1999 | Stuber et al. | |
| 6,125,812 A | 10/2000 | Garabedian | |
| 6,158,411 A | 12/2000 | Morikawa | |
| 6,244,242 B1 | 6/2001 | Grizzle et al. | |
| 6,247,449 B1 | 6/2001 | Persson | |
| 6,272,427 B1 | 8/2001 | Wild et al. | |
| 6,286,366 B1 | 9/2001 | Chen et al. | |
| 6,295,500 B1 | 9/2001 | Cullen et al. | |
| 6,332,446 B1 | 12/2001 | Matsumoto et al. | |
| 6,334,425 B1 | 1/2002 | Nagatani et al. | |
| 6,355,986 B1 | 3/2002 | Kato et al. | |
| 6,360,724 B1 | 3/2002 | Suhre et al. | |
| 6,363,316 B1 | 3/2002 | Soliman et al. | |
| 6,371,075 B2 | 4/2002 | Koch | |
| 6,385,521 B1 | 5/2002 | Ito | |
| 6,408,625 B1 | 6/2002 | Woon et al. | |
| 6,520,140 B2 | 2/2003 | Dreymuller et al. | |
| 6,546,912 B2 | 4/2003 | Tuken | |
| 6,588,261 B1 | 7/2003 | Wild et al. | |
| 6,619,258 B2 | 9/2003 | McKay et al. | |
| 6,622,548 B1 | 9/2003 | Hernandez | |
| 6,694,806 B2 | 2/2004 | Kumagai et al. | |
| 6,738,707 B2 | 5/2004 | Kotwicki et al. | |
| 6,754,577 B2 | 6/2004 | Gross et al. | |
| 6,760,656 B2 | 7/2004 | Matthews et al. | |
| 6,850,831 B2 | 2/2005 | Buckland et al. | |
| 6,909,961 B2 | 6/2005 | Wild et al. | |
| 6,978,204 B2 | 12/2005 | Surnilla et al. | |
| 6,980,902 B2 | 12/2005 | Nakazawa | |
| 6,981,492 B2 | 1/2006 | Barba et al. | |
| 6,983,737 B2 | 1/2006 | Gross et al. | |
| 7,003,390 B2 | 2/2006 | Kaga | |
| 7,024,301 B1 | 4/2006 | Kar et al. | |
| 7,025,041 B2 | 4/2006 | Abe et al. | |
| 7,028,661 B1 | 4/2006 | Bonne et al. | |
| 7,032,545 B2 | 4/2006 | Lewis et al. | |
| 7,032,581 B2 | 4/2006 | Gibson et al. | |
| 7,044,101 B1 | 5/2006 | Duty et al. | |
| 7,063,062 B2 | 6/2006 | Lewis et al. | |
| 7,066,121 B2 | 6/2006 | Michelini et al. | |
| 7,066,136 B2 | 6/2006 | Ogiso | |
| 7,069,718 B2 | 7/2006 | Surnilla et al. | |
| 7,069,773 B2 | 7/2006 | Stempnik et al. | |
| 7,086,386 B2 | 8/2006 | Doering | |
| 7,100,720 B2 | 9/2006 | Ishikawa | |
| 7,111,612 B2 | 9/2006 | Michelini et al. | |
| 7,140,355 B2 | 11/2006 | Michelini et al. | |
| 7,159,568 B1 | 1/2007 | Lewis et al. | |
| 7,174,713 B2 | 2/2007 | Nitzke et al. | |
| 7,174,879 B1 | 2/2007 | Chol et al. | |
| 7,200,486 B2 | 4/2007 | Tanaka et al. | |
| 7,203,588 B2 | 4/2007 | Kaneko et al. | |
| 7,231,907 B2 | 6/2007 | Bolander et al. | |
| 7,278,391 B1 | 10/2007 | Wong et al. | |
| 7,292,231 B2 | 11/2007 | Kodama et al. | |
| 7,292,931 B2 | 11/2007 | Davis et al. | |
| 7,319,929 B1 | 1/2008 | Davis et al. | |
| 7,363,111 B2 | 4/2008 | Vian et al. | |
| 7,367,318 B2 | 5/2008 | Moriya et al. | |
| 7,415,345 B2 | 8/2008 | Wild | |
| 7,440,838 B2 | 10/2008 | Livshiz et al. | |
| 7,464,676 B2 | 12/2008 | Wiggins et al. | |
| 7,472,014 B1 | 12/2008 | Albertson et al. | |
| 7,497,074 B2 | 3/2009 | Surnilla et al. | |
| 7,499,791 B2 | 3/2009 | You et al. | |
| 7,503,312 B2 | 3/2009 | Surnilla et al. | |
| 7,509,201 B2 | 3/2009 | Bolander et al. | |
| 7,555,896 B2 | 7/2009 | Lewis et al. | |
| 7,577,511 B1 | 8/2009 | Tripathi et al. | |
| 7,581,531 B2 | 9/2009 | Schulz | |
| 7,614,384 B2 | 11/2009 | Livshiz et al. | |
| 7,620,188 B2 | 11/2009 | Inoue et al. | |
| 7,621,262 B2 | 11/2009 | Zubeck | |
| 7,634,349 B2 | 12/2009 | Senft et al. | |
| 7,685,976 B2 | 3/2010 | Marriott | |
| 7,785,230 B2 | 8/2010 | Gibson et al. | |
| 7,836,866 B2 * | 11/2010 | Luken | F02D 17/02 123/481 |
| 7,849,835 B2 | 12/2010 | Tripathi et al. | |
| 7,886,715 B2 | 2/2011 | Tripathi et al. | |
| 7,930,087 B2 | 4/2011 | Gibson et al. | |
| 7,946,263 B2 | 5/2011 | O'Neill et al. | |
| 7,954,474 B2 | 6/2011 | Tripathi et al. | |
| 8,050,841 B2 | 11/2011 | Costin et al. | |
| 8,099,224 B2 | 1/2012 | Tripathi et al. | |
| 8,108,132 B2 | 1/2012 | Reinke | |
| 8,131,445 B2 | 3/2012 | Tripathi et al. | |
| 8,131,447 B2 | 3/2012 | Tripathi et al. | |
| 8,135,410 B2 | 3/2012 | Forte | |
| 8,145,410 B2 | 3/2012 | Berger et al. | |
| 8,146,565 B2 | 4/2012 | Leone et al. | |
| 8,272,367 B2 | 9/2012 | Shikama et al. | |
| 8,347,856 B2 | 1/2013 | Leone et al. | |
| 8,402,942 B2 | 3/2013 | Tripathi et al. | |
| 8,473,179 B2 | 6/2013 | Whitney et al. | |
| 8,616,181 B2 | 12/2013 | Sahandiesfanjani et al. | |
| 8,646,430 B2 | 2/2014 | Kinoshita | |
| 8,646,435 B2 | 2/2014 | Dibble et al. | |
| 8,701,628 B2 | 4/2014 | Tripathi et al. | |
| 8,706,383 B2 | 4/2014 | Sauve et al. | |
| 8,833,058 B2 | 9/2014 | Ervin et al. | |
| 8,833,345 B2 | 9/2014 | Pochner et al. | |
| 8,869,773 B2 | 10/2014 | Tripathi et al. | |
| 8,979,708 B2 | 3/2015 | Burtch | |
| 9,020,735 B2 | 4/2015 | Tripathi et al. | |
| 9,140,622 B2 | 9/2015 | Beikmann | |
| 9,200,575 B2 | 12/2015 | Shost | |
| 9,212,610 B2 | 12/2015 | Chen et al. | |

(56) References Cited

U.S. PATENT DOCUMENTS

| | | |
|---|---|---|
| 9,222,427 B2 | 12/2015 | Matthews et al. |
| 2001/0007964 A1 | 7/2001 | Poljansek et al. |
| 2002/0038654 A1 | 4/2002 | Sasaki et al. |
| 2002/0039950 A1 | 4/2002 | Graf et al. |
| 2002/0156568 A1 | 10/2002 | Knott et al. |
| 2002/0162540 A1 | 11/2002 | Matthews et al. |
| 2002/0189574 A1 | 12/2002 | Kim |
| 2003/0101961 A1* | 6/2003 | Foster ............... B60H 1/00314 123/198 F |
| 2003/0116130 A1 | 6/2003 | Kisaka et al. |
| 2003/0123467 A1 | 7/2003 | Du et al. |
| 2003/0131820 A1 | 7/2003 | Mckay et al. |
| 2003/0172900 A1 | 9/2003 | Boyer et al. |
| 2004/0007211 A1 | 1/2004 | Kobayashi |
| 2004/0034460 A1 | 2/2004 | Folkerts et al. |
| 2004/0069290 A1 | 4/2004 | Bucktron et al. |
| 2004/0122584 A1 | 6/2004 | Muto et al. |
| 2004/0129249 A1 | 7/2004 | Kondo |
| 2004/0138027 A1 | 7/2004 | Rustige et al. |
| 2004/0206072 A1 | 10/2004 | Surnilla et al. |
| 2004/0258251 A1 | 12/2004 | Inoue et al. |
| 2005/0016492 A1 | 1/2005 | Matthews |
| 2005/0056250 A1 | 3/2005 | Stroh |
| 2005/0098156 A1 | 5/2005 | Ohtani |
| 2005/0131618 A1 | 6/2005 | Megli et al. |
| 2005/0197761 A1 | 9/2005 | Bidner et al. |
| 2005/0199220 A1 | 9/2005 | Ogiso |
| 2005/0204726 A1 | 9/2005 | Lewis |
| 2005/0204727 A1 | 9/2005 | Lewis et al. |
| 2005/0205028 A1 | 9/2005 | Lewis et al. |
| 2005/0205045 A1 | 9/2005 | Michelini et al. |
| 2005/0205060 A1 | 9/2005 | Michelini et al. |
| 2005/0205063 A1 | 9/2005 | Kolmanovsky et al. |
| 2005/0205069 A1 | 9/2005 | Lewis et al. |
| 2005/0205074 A1 | 9/2005 | Gibson et al. |
| 2005/0235743 A1 | 10/2005 | Stempnik et al. |
| 2006/0107919 A1 | 5/2006 | Nishi et al. |
| 2006/0112918 A1 | 6/2006 | Persson |
| 2006/0130814 A1 | 6/2006 | Bolander et al. |
| 2006/0178802 A1 | 8/2006 | Bolander et al. |
| 2007/0012040 A1 | 1/2007 | Nitzke et al. |
| 2007/0042861 A1 | 2/2007 | Takaoka et al. |
| 2007/0051351 A1 | 3/2007 | Pallett et al. |
| 2007/0100534 A1 | 5/2007 | Katsumata |
| 2007/0101969 A1 | 5/2007 | Lay et al. |
| 2007/0107692 A1 | 5/2007 | Kuo et al. |
| 2007/0131169 A1 | 6/2007 | Ahn |
| 2007/0131196 A1 | 6/2007 | Gibson et al. |
| 2007/0135988 A1 | 6/2007 | Kidston et al. |
| 2007/0235005 A1 | 10/2007 | Lewis |
| 2008/0000149 A1 | 1/2008 | Aradi |
| 2008/0041327 A1 | 2/2008 | Lewis et al. |
| 2008/0066699 A1 | 3/2008 | Michelini et al. |
| 2008/0098969 A1 | 5/2008 | Reed et al. |
| 2008/0109151 A1 | 5/2008 | Jaros et al. |
| 2008/0121211 A1 | 5/2008 | Livshiz et al. |
| 2008/0154468 A1 | 6/2008 | Berger et al. |
| 2008/0254926 A1 | 10/2008 | Schuseil et al. |
| 2008/0262698 A1 | 10/2008 | Lahti et al. |
| 2008/0288146 A1 | 11/2008 | Beechie et al. |
| 2009/0007877 A1 | 1/2009 | Raiford |
| 2009/0013667 A1 | 1/2009 | Winstead |
| 2009/0013668 A1 | 1/2009 | Winstead |
| 2009/0013669 A1 | 1/2009 | Winstead |
| 2009/0013969 A1 | 1/2009 | Winstead |
| 2009/0018746 A1 | 1/2009 | Miller et al. |
| 2009/0030594 A1 | 1/2009 | You et al. |
| 2009/0042458 A1 | 2/2009 | Kinoshita |
| 2009/0042463 A1 | 2/2009 | Kinoshita |
| 2009/0118914 A1 | 5/2009 | Schwenke et al. |
| 2009/0118965 A1 | 5/2009 | Livshiz et al. |
| 2009/0118968 A1 | 5/2009 | Livshiz et al. |
| 2009/0118975 A1 | 5/2009 | Murakami et al. |
| 2009/0118986 A1 | 5/2009 | Kita |
| 2009/0177371 A1 | 7/2009 | Reinke |
| 2009/0204312 A1 | 8/2009 | Moriya |
| 2009/0229562 A1 | 9/2009 | Ramappan et al. |
| 2009/0241872 A1 | 10/2009 | Wang et al. |
| 2009/0248277 A1 | 10/2009 | Shinagawa et al. |
| 2009/0248278 A1 | 10/2009 | Nakasaka |
| 2009/0292435 A1 | 11/2009 | Costin et al. |
| 2010/0006065 A1 | 1/2010 | Tripathi et al. |
| 2010/0010724 A1 | 1/2010 | Tripathi et al. |
| 2010/0012072 A1 | 1/2010 | Leone et al. |
| 2010/0030447 A1 | 2/2010 | Smyth et al. |
| 2010/0036571 A1 | 2/2010 | Han et al. |
| 2010/0042308 A1 | 2/2010 | Kobayashi et al. |
| 2010/0050993 A1 | 3/2010 | Zhao et al. |
| 2010/0057283 A1 | 3/2010 | Worthing et al. |
| 2010/0059004 A1 | 3/2010 | Gill |
| 2010/0100299 A1 | 4/2010 | Tripathi et al. |
| 2010/0107630 A1 | 5/2010 | Hamama et al. |
| 2010/0211299 A1 | 8/2010 | Lewis et al. |
| 2010/0222989 A1 | 9/2010 | Nishimura |
| 2010/0282202 A1 | 11/2010 | Luken |
| 2010/0318275 A1 | 12/2010 | Borchsenius et al. |
| 2011/0005496 A1 | 1/2011 | Hiraya et al. |
| 2011/0030657 A1 | 2/2011 | Tripathi et al. |
| 2011/0048372 A1 | 3/2011 | Dibble et al. |
| 2011/0088661 A1 | 4/2011 | Sczomak et al. |
| 2011/0094475 A1 | 4/2011 | Riegel et al. |
| 2011/0107986 A1 | 5/2011 | Winstead |
| 2011/0118955 A1 | 5/2011 | Livshiz et al. |
| 2011/0144883 A1 | 6/2011 | Rollinger et al. |
| 2011/0178693 A1 | 7/2011 | Chang et al. |
| 2011/0208405 A1 | 8/2011 | Tripathi et al. |
| 2011/0213526 A1 | 9/2011 | Giles et al. |
| 2011/0213540 A1 | 9/2011 | Tripathi et al. |
| 2011/0213541 A1 | 9/2011 | Tripathi et al. |
| 2011/0251773 A1 | 10/2011 | Sahandiesfanjani et al. |
| 2011/0264342 A1 | 10/2011 | Baur et al. |
| 2011/0265454 A1 | 11/2011 | Smith et al. |
| 2011/0265771 A1 | 11/2011 | Banker et al. |
| 2011/0295483 A1 | 12/2011 | Ma et al. |
| 2011/0313643 A1 | 12/2011 | Lucatello et al. |
| 2012/0029787 A1 | 2/2012 | Whitney et al. |
| 2012/0055444 A1 | 3/2012 | Tobergte et al. |
| 2012/0103312 A1 | 5/2012 | Sasai et al. |
| 2012/0109495 A1 | 5/2012 | Tripathi et al. |
| 2012/0116647 A1 | 5/2012 | Pochner et al. |
| 2012/0143471 A1 | 6/2012 | Tripathi et al. |
| 2012/0180759 A1 | 7/2012 | Whitney et al. |
| 2012/0221217 A1 | 8/2012 | Sujan et al. |
| 2012/0285161 A1 | 11/2012 | Kerns et al. |
| 2013/0092127 A1 | 4/2013 | Pirjaberi et al. |
| 2013/0092128 A1 | 4/2013 | Pirjaberi et al. |
| 2013/0184949 A1 | 7/2013 | Saito et al. |
| 2013/0289853 A1 | 10/2013 | Serrano |
| 2013/0333663 A1* | 12/2013 | Chen ....................... F02D 17/02 123/334 |
| 2014/0041625 A1 | 2/2014 | Pirjaberi et al. |
| 2014/0041641 A1 | 2/2014 | Carlson et al. |
| 2014/0053802 A1 | 2/2014 | Rayl |
| 2014/0053803 A1 | 2/2014 | Rayl |
| 2014/0053804 A1 | 2/2014 | Rayl et al. |
| 2014/0053805 A1 | 2/2014 | Brennan et al. |
| 2014/0069178 A1 | 3/2014 | Beikmann |
| 2014/0069374 A1 | 3/2014 | Matthews |
| 2014/0069375 A1 | 3/2014 | Matthews et al. |
| 2014/0069376 A1 | 3/2014 | Matthews et al. |
| 2014/0069377 A1 | 3/2014 | Brennan et al. |
| 2014/0069378 A1 | 3/2014 | Burleigh et al. |
| 2014/0069379 A1 | 3/2014 | Beikmann |
| 2014/0069381 A1 | 3/2014 | Beikmann |
| 2014/0090623 A1 | 4/2014 | Beikmann |
| 2014/0090624 A1 | 4/2014 | Verner |
| 2014/0102411 A1 | 4/2014 | Brennan |
| 2014/0190448 A1 | 7/2014 | Brennan et al. |
| 2014/0190449 A1 | 7/2014 | Phillips |
| 2014/0194247 A1 | 7/2014 | Burtch |
| 2014/0207359 A1 | 7/2014 | Phillips |
| 2015/0240671 A1 | 8/2015 | Nakamura |
| 2015/0260112 A1 | 9/2015 | Liu et al. |

(56) References Cited

U.S. PATENT DOCUMENTS

| | | | |
|---|---|---|---|
| 2015/0260117 A1 | 9/2015 | Shost et al. | |
| 2015/0354470 A1 | 12/2015 | Li et al. | |
| 2015/0361907 A1 | 12/2015 | Hayman et al. | |

FOREIGN PATENT DOCUMENTS

| | | | |
|---|---|---|---|
| CN | 101220780 A | 7/2008 | |
| CN | 101353992 A | 1/2009 | |
| CN | 101476507 A | 7/2009 | |
| CN | 101586504 A | 11/2009 | |
| CN | 102454493 A | 5/2012 | |
| EP | 1489595 A2 | 12/2004 | |
| JP | 2010223019 A | 10/2010 | |
| JP | 2011149352 A | 8/2011 | |

OTHER PUBLICATIONS

International Search Report and Written Opinion dated Jun. 17, 2015 corresponding to International Application No. PCT/US2015/019496, 14 pages.
Glossary of Judicial Claim Constructions in the Electronics, Computer and Business Method Arts. Public Patent Foundation. (2010).
U.S. Appl. No. 13/798,351, filed Mar. 13, 2013, Rayl.
U.S. Appl. No. 13/798,384, filed Mar. 13, 2013, Burtch.
U.S. Appl. No. 13/798,400, filed Mar. 13, 2013, Phillips.
U.S. Appl. No. 13/798,435, filed Mar. 13, 2013, Matthews.
U.S. Appl. No. 13/798,451, filed Mar. 13, 2013, Rayl.
U.S. Appl. No. 13/798,471, filed Mar. 13, 2013, Matthews et al.
U.S. Appl. No. 13/798,518, filed Mar. 13, 2013, Beikmann.
U.S. Appl. No. 13/798,536, filed Mar. 13, 2013, Matthews et al.
U.S. Appl. No. 13/798,540, filed Mar. 13, 2013, Brennan et al.
U.S. Appl. No. 13/798,574, filed Mar. 13, 2013, Verner.
U.S. Appl. No. 13/798,586, filed Mar. 13, 2013, Rayl et al.
U.S. Appl. No. 13/798,590, filed Mar. 13, 2013, Brennan et al.
U.S. Appl. No. 13/798,624, filed Mar. 13, 2013, Brennan et al.
U.S. Appl. No. 13/798,701, filed Mar. 13, 2013, Burleigh et al.
U.S. Appl. No. 13/798,737, filed Mar. 13, 2013, Beikmann.
U.S. Appl. No. 13/798,775, filed Mar. 13, 2013, Phillips.
U.S. Appl. No. 13/799,116, filed Mar. 13, 2013, Brennan.
U.S. Appl. No. 13/799,129, filed Mar. 13, 2013, Beikmann.
U.S. Appl. No. 13/799,181, filed Mar. 13, 2013, Beikmann.
U.S. Appl. No. 14/143,267, filed Dec. 30, 2013, Gehringer et al.
U.S. Appl. No. 14/211,389, filed Mar. 14, 2014, Liu et al.
U.S. Appl. No. 14/300,469, filed Jun. 10, 2014, Li et al.
U.S. Appl. No. 14/310,063, filed Jun. 20, 2014, Wagh et al.
U.S. Appl. No. 14/449,726, filed Aug. 1, 2014, Hayman et al.
U.S. Appl. No. 61/952,737, filed Mar. 13, 2014, Shost et al.

\* cited by examiner

COMBINATION CYLINDER STATE AND TRANSMISSION GEAR CONTROL SYSTEMS AND METHODS

FIELD

The present disclosure relates to internal combustion engines and more particularly to systems and methods for controlling both cylinder activation/deactivation and transmission gear ratio.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. In some types of engines, air flow into the engine may be regulated via a throttle. The throttle may adjust throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders generally increases the torque output of the engine.

Under some circumstances, one or more cylinders of an engine may be deactivated. Deactivation of a cylinder may include deactivating opening and closing of intake and exhaust valves of the cylinder and halting fueling of the cylinder. One or more cylinders may be deactivated, for example, to decrease fuel consumption when the engine can produce a requested amount of torque while the one or more cylinders are deactivated.

SUMMARY

A control system of a vehicle is disclosed. A firing module determines a target number of activated cylinders of an engine based on a torque request and a present gear ratio of a transmission. A combination identification module, based on the torque request, identifies a combination including a possible number of activated cylinders and a possible transmission gear ratio, wherein at least one of: the possible number of activated cylinders is different than the target number of activated cylinders; and the possible transmission gear ratio is different than the present gear ratio of the transmission. A fueling estimation module determines a first fuel consumption for the target number of activated cylinders and the present gear ratio and that determines a second fuel consumption for the possible number of activated cylinders and the possible transmission gear ratio. A transitioning module, when the second fuel consumption is less than the first fuel consumption, selectively: transitions the target number of activated cylinders to the possible number of activated cylinders; and transitions a target gear ratio of the transmission to the possible transmission gear ratio. An activation/deactivation module controls cylinder activation and deactivation based on the target number of activated cylinders.

In further features, a transmission control module controls the transmission based on the target gear ratio.

In further features, the transitioning module selectively prevents the transitions when a difference between the present gear ratio and the possible transmission gear ratio is greater than a predetermined value.

In further features, the combination identification module identifies the combination including the possible number of activated cylinders and the possible transmission gear ratio further based on a vehicle speed.

In further features, the combination identification module identifies the combination including the possible number of activated cylinders and the possible transmission gear ratio further based on an engine speed.

In further features, the fueling estimation module: determines the first fuel consumption based on the target number of activated cylinders, the present gear ratio, and the torque request; and determines the second fuel consumption based on the possible number of activated cylinders, the possible transmission gear ratio, and the torque request.

In further features, the fueling estimation module determines the first and second fuel consumptions further based on a vehicle speed and an engine speed.

In further features, the fueling estimation module determines the first and second fuel consumptions using a mapping that relates numbers of activated cylinders and gear ratios to fuel consumptions.

In further features: the combination identification module, based on the torque request, further identifies a second combination including a second possible number of activated cylinders and a second possible transmission gear ratio. At least one of: the second possible number of activated cylinders is different than the target number of activated cylinders; and the second possible transmission gear ratio is different than the present gear ratio of the transmission. Additionally, at least one of: the second possible number of activated cylinders is different than the possible number of activated cylinders; and the second possible transmission gear ratio is different than the possible transmission gear ratio. The fueling estimation module further determines a third fuel consumption for the second possible number of activated cylinders and the second possible transmission gear ratio.

In further features, when the second fuel consumption is also less than the third fuel consumption, the transitioning module selectively: transitions the target number of activated cylinders to the possible number of activated cylinders; and transitions the target gear ratio of the transmission to the possible transmission gear ratio.

A control method for a vehicle includes: determining a target number of activated cylinders of an engine based on a torque request and a present gear ratio of a transmission; and based on the torque request, identifying a combination including a possible number of activated cylinders and a possible transmission gear ratio, wherein at least one of: the possible number of activated cylinders is different than the target number of activated cylinders; and the possible transmission gear ratio is different than the present gear ratio of the transmission. The method further includes: determining a first fuel consumption for the target number of activated cylinders and the present gear ratio; determining a second fuel consumption for the possible number of activated cylinders and the possible transmission gear ratio; when the second fuel consumption is less than the first fuel consumption, selectively: transitioning the target number of activated cylinders to the possible number of activated cylinders; and transitioning a target gear ratio of the transmission to the possible transmission gear ratio; and controlling cylinder activation and deactivation based on the target number of activated cylinders.

In further features, the method further includes controlling the transmission based on the target gear ratio.

In further features, the method further includes selectively preventing the transitioning when a difference between the present gear ratio and the possible transmission gear ratio is greater than a predetermined value.

In further features, the method further includes identifying the combination including the possible number of activated cylinders and the possible transmission gear ratio further based on a vehicle speed.

In further features, the method further includes identifying the combination including the possible number of activated cylinders and the possible transmission gear ratio further based on an engine speed.

In further features, the method further includes: determining the first fuel consumption based on the target number of activated cylinders, the present gear ratio, and the torque request; and determining the second fuel consumption based on the possible number of activated cylinders, the possible transmission gear ratio, and the torque request.

In further features, the method further includes determining the first and second fuel consumptions further based on a vehicle speed and an engine speed.

In further features, the method further includes determining the first and second fuel consumptions using a mapping that relates numbers of activated cylinders and gear ratios to fuel consumptions.

In further features, the method further includes: based on the torque request, identifying a second combination including a second possible number of activated cylinders and a second possible transmission gear ratio; at least one of: the second possible number of activated cylinders is different than the target number of activated cylinders; and the second possible transmission gear ratio is different than the present gear ratio of the transmission; and at least one of: the second possible number of activated cylinders is different than the possible number of activated cylinders; and the second possible transmission gear ratio is different than the possible transmission gear ratio; and determining a third fuel consumption for the second possible number of activated cylinders and the second possible transmission gear ratio.

In further features, the method further includes, when the second fuel consumption is also less than the third fuel consumption, selectively: transitioning the target number of activated cylinders to the possible number of activated cylinders; and transitioning the target gear ratio of the transmission to the possible transmission gear ratio.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Internal combustion engines combust an air and fuel mixture within cylinders to generate torque. Under some circumstances, an engine control module (ECM) may deactivate one or more cylinders of the engine. The ECM may deactivate one or more cylinders, for example, to decrease fuel consumption.

The ECM determines a target firing fraction for the cylinders of the engine to achieve an engine torque request given a current gear ratio of a transmission. A numerator of the target firing fraction may indicate how many cylinders to activate (Y) during the next X number of cylinders in a firing order of the cylinders, where X is the denominator of the target firing fraction. The ECM activates and deactivates cylinders of the engine in a predetermined firing order of the cylinders to achieve the target firing fraction.

According to the present disclosure, the ECM determines other possible combinations of transmission gear ratio and target firing fraction that can be used to achieve the engine torque request. The ECM selectively transitions to a different combination of target firing fraction and transmission gear ratio when use of that combination of target firing fraction and transmission gear ratio may provide a fuel consumption decrease.

Figure 1:
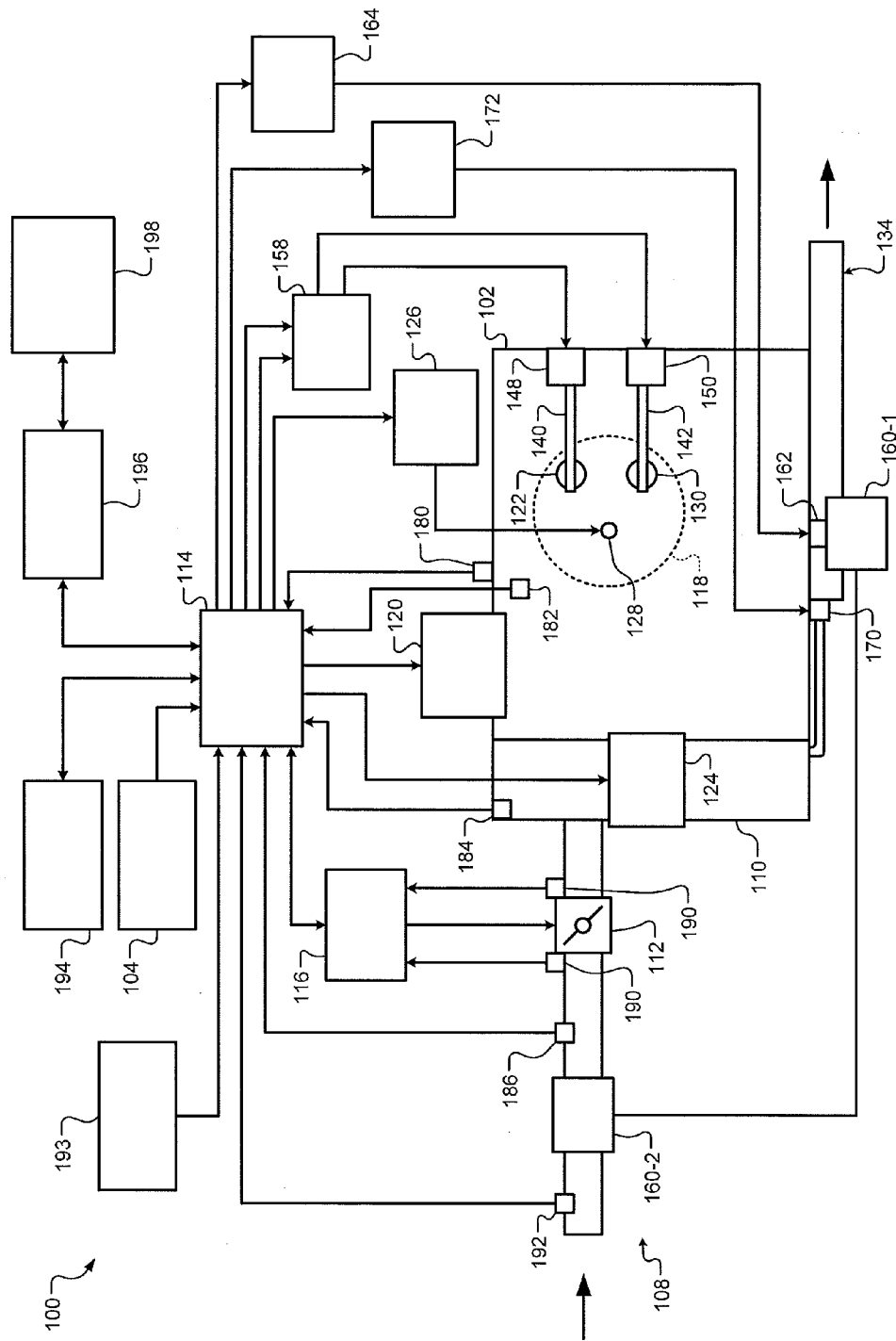
FIG. 1 is a functional block diagram of an example engine system.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114.

When implemented, variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194, for example, to coordinate shifting gears in a transmission. For example, the ECM 114 may reduce engine torque during a gear shift. The ECM 114 may communicate with a hybrid control module 196, for example, to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, boost pressure, and EGR valve opening area, respectively. The ECM 114 may control the actuator values in order to cause the engine 102 to generate a requested engine output torque.

Figure 2:
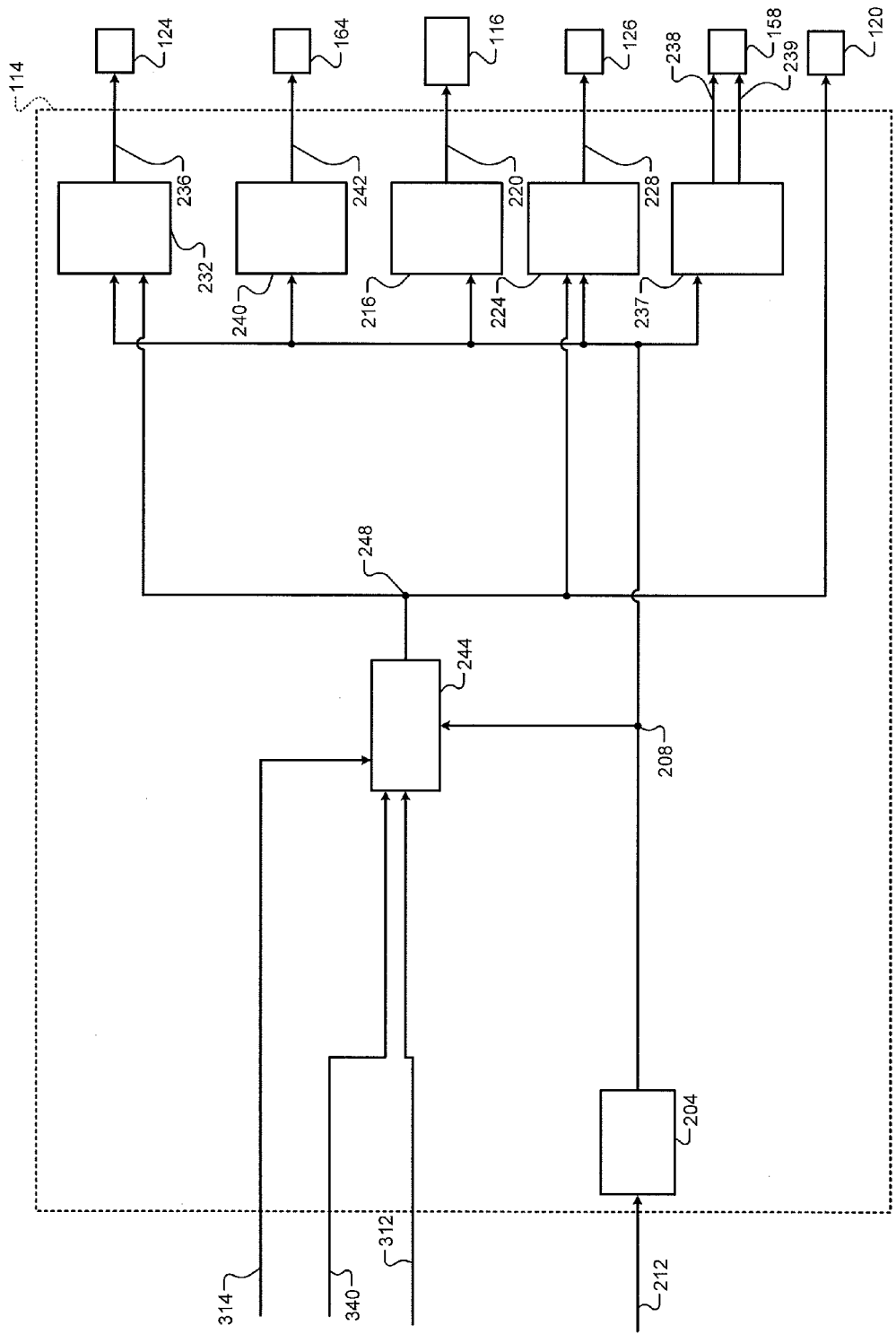
FIG. 2 is a functional block diagram of an example engine control system.

Referring now to FIG. 2, a functional block diagram of an example engine control system is presented. A torque request module 204 determines a torque request 208 for the engine 102 based on one or more driver inputs 212. The driver inputs 212 may include, for example, an accelerator pedal position, a brake pedal position, a cruise control input, and/or one or more other suitable driver inputs. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators are controlled based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220.

A spark control module 224 determines a target spark timing 228 based on the torque request 208. The spark actuator module 126 generates spark based on the target spark timing 228. A fuel control module 232 determines one or more target fueling parameters 236 based on the torque request 208. For example, the target fueling parameters 236 may include fuel injection amount, number of fuel injections for injecting the amount, and timing for each of the injections. The fuel actuator module 124 injects fuel based on the target fueling parameters 236.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively. A boost control module 240 may determine a target boost 242 based on the torque request 208. The boost actuator module 164 may control boost output by the boost device(s) based on the target boost 242.

A cylinder control module 244 generates an activation/deactivation command 248 for a next cylinder in a predetermined firing order of the cylinders ("the next cylinder"). The activation/deactivation command 248 indicates whether the next cylinder should be activated or deactivated. For example only, the cylinder control module 244 may set the activation/deactivation command 248 to a first state (e.g., 1) when the next cylinder should be activated and set the activation/deactivation command 248 to a second state (e.g., 0) when the next cylinder should be deactivated. While the activation/deactivation command 248 is and will be discussed with respect to the next cylinder in the predetermined firing order, the activation/deactivation command 248 may be generated for a second cylinder immediately following the next cylinder in the predetermined firing order, a third cylinder immediately following the second cylinder in the predetermined firing order, or another cylinder following the next cylinder in the predetermined firing order.

The cylinder actuator module 120 deactivates the intake and exhaust valves of the next cylinder when the activation/deactivation command 248 indicates that the next cylinder should be deactivated. The cylinder actuator module 120 allows opening and closing of the intake and exhaust valves of the next cylinder when the activation/deactivation command 248 indicates that the next cylinder should be activated.

The fuel control module 232 halts fueling of the next cylinder when the activation/deactivation command 248 indicates that the next cylinder should be deactivated. The fuel control module 232 sets the target fueling parameters 236 to provide fuel to the next cylinder when the activation/deactivation command 248 indicates that the next cylinder should be activated. The spark control module 224 may provide spark to the next cylinder when the activation/deactivation command 248 indicates that the next cylinder should be activated. The spark control module 224 may provide or halt spark to the next cylinder when the activation/deactivation command 248 indicates that the next cylinder should be deactivated. Cylinder deactivation is different than fuel cutoff (e.g., deceleration fuel cutoff) in that the intake and exhaust valves of cylinders to which fueling is halted during fuel cutoff may still be opened and closed during fuel cutoff whereas the intake and exhaust valves of cylinders are maintained closed when those cylinders are deactivated.

Figure 3:
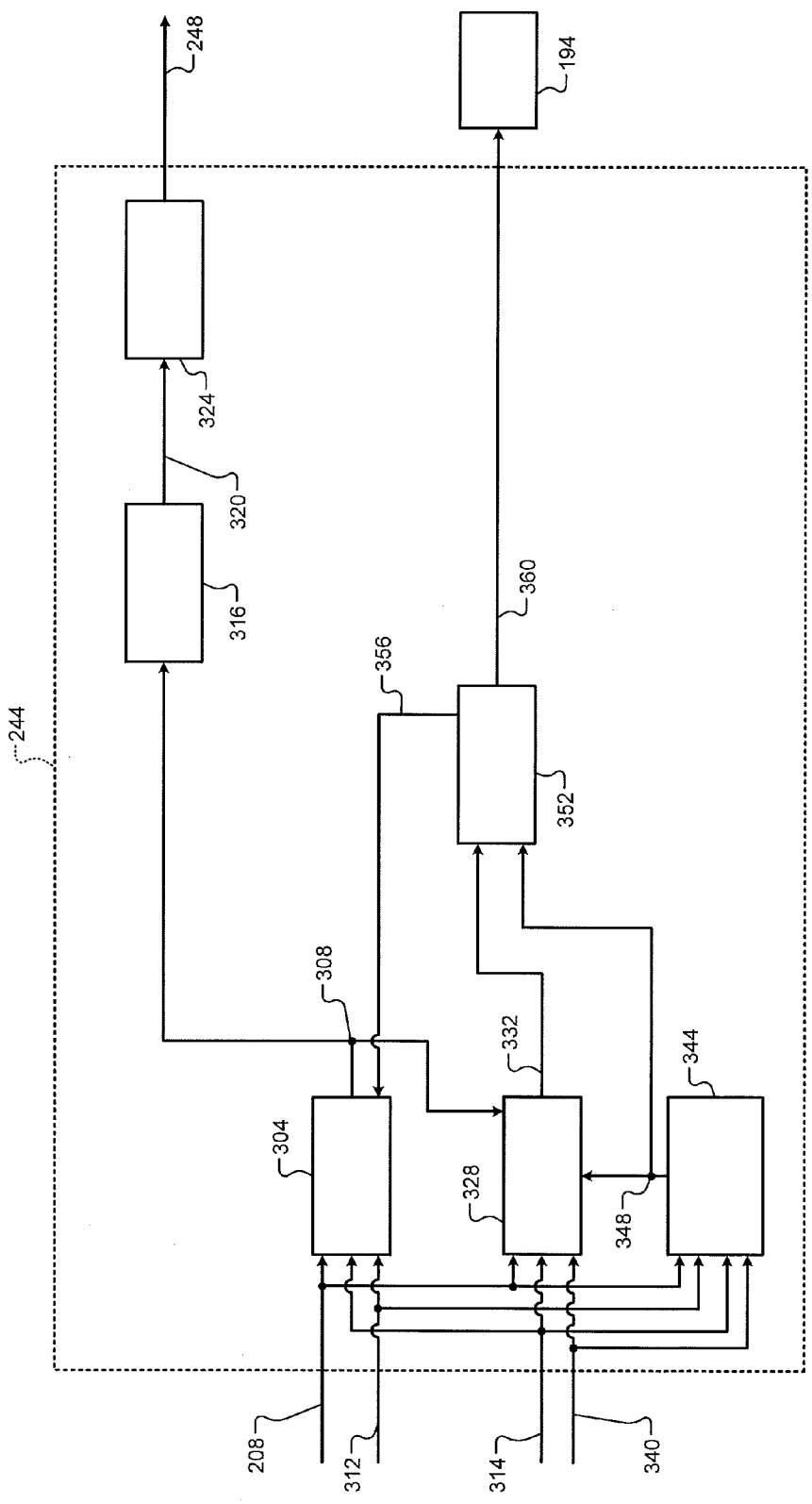
FIG. 3 is a functional block diagram of an example cylinder control module.

FIG. 3 is a functional block diagram of an example implementation of the cylinder control module 244. A firing module 304 determines a target firing fraction 308. A numerator of the target firing fraction 308 corresponds to a target number of cylinders to be activated out of the next N cylinders in the predetermined firing order of the cylinders, and N is the denominator of the target firing fraction 308. For example, a target firing fraction of ⅝ indicates that 5 of the next 8 cylinders in the predetermined firing order should be activated. In this example, 3 of the next 8 cylinders in the predetermined firing order should therefore be deactivated. A target firing fraction of 0 corresponds to all of the cylinders of the engine 102 being deactivated (and 0 being activated), and a target firing fraction of 1 corresponds to all of the cylinders of the engine 102 being activated (and 0 being deactivated).

The firing module 304 determines the target firing fraction 308 based on the torque request 208, an engine speed 312, and a current gear ratio 314 of the transmission. For example, the firing module 304 may determine the target firing fraction 308 using one of a function and a mapping that relates torque requests, engine speeds, and gear ratios to the target firing fraction 308. The engine speed 312 may be determined, for example, based on crankshaft position measured using the crankshaft position sensor 180. The transmission control module 194 controls which gear ratio is engaged within the transmission and may provide the current gear ratio 314.

A sequence module 316 determines a target sequence 320 for activating and deactivating cylinders to achieve the target firing fraction 308. One or more possible sequences for activating and deactivating cylinders may be stored for each possible target firing fraction.

Each of the possible sequences for a given target firing fraction includes a sequence of a plurality of entries for activating and deactivating cylinders to achieve that target firing fraction. For example, one possible sequence for achieving a target firing fraction of ⅝ may be:

[1, 0, 1, 1, 0, 1, 0, 1], where a 1 indicates an activated cylinder and a 0 indicates a deactivated cylinder. Other possible sequences for achieving a target firing fraction of ⅝ include, but are not limited to:

[1, 1, 0, 1, 0, 1, 0, 1],
[1, 0, 0, 1, 1, 0, 1, 1], and
[0, 1, 1, 0, 1, 1, 0, 1].

Exceptions where only 1 possible sequence may be stored include target firing fractions of 0 and 1, where zero and all cylinders are activated, respectively. The sequence module 316 may select one of the possible sequences, for example, based on one or more vehicle operating parameters. An activation/deactivation module 324 generates the activation/deactivation command 248, and cylinders are therefore activated and deactivated, according to the target sequence 320.

A fueling estimation module 328 determines an estimated fuel consumption 332 based on the target firing fraction 308 and the current gear ratio 314 of the transmission. The fueling estimation module 328 may determine the estimated fuel consumption 332 for the target firing fraction 308 and the current gear ratio 314 further based on the torque request 208, the engine speed 312, and/or a vehicle speed 340. For example, the fueling estimation module 328 may determine the estimated fuel consumption 332 using one of a function and a mapping that relates target firing fractions, gear ratios, torque requests, engine speeds, and/or vehicle speeds to fuel consumption values. In various implementations, the fuel consumption values may be brake specific fuel consumption (BSFC) values. The vehicle speed 340 may be determined, for example, based on one or more measured wheel speeds.

A combination identification module 344 identifies other possible combinations 348 of target firing fraction and transmission gear ratio that could be used given the torque request 208, the engine speed 312, and the vehicle speed 340. For example, the combination identification module 344 may identify the other possible combinations 348 of target firing fraction and transmission gear ratio using a mapping that includes possible target firing fractions and gear ratios indexed by torque requests, engine speeds, and vehicle speeds. The other possible combinations 348 each include a possible target gear ratio that is different than the current gear ratio 314 of the transmission and/or a possible target firing fraction that is different than the target firing fraction 308.

The fueling estimation module 328 also determines estimated fuel consumptions 332 for the other possible combinations 348, respectively. The fueling estimation module 328 may determine the estimated fuel consumptions 332 for the other possible combinations 348 further based on the torque request 208, the engine speed 312, and/or the vehicle speed 340. For example, the fueling estimation module 328 may determine the estimated fuel consumptions 332 using the function or mapping that relates target firing fractions, gear ratios, torque requests, engine speeds, and/or vehicle speeds to fuel consumption values.

A transitioning module 352 identifies ones of the other possible combinations 348 having estimated fuel consumptions 332 that are less than the estimated fuel consumption 332 of the target firing fraction 308 and the current gear ratio 314. The ones of the other possible combinations 348 having estimated fuel consumptions 332 that are less than the estimated fuel consumption 332 of the target firing fraction 308 and the current gear ratio 314 will be referred to as identified possible combinations. Transitioning to one of the identified possible combinations may be expected to provide a fuel consumption decrease.

The transitioning module 352 determines whether a transition can be made to one of the identified possible combinations under the current operating conditions. Whether a transition can be made is discussed in more detail below. If so, the transitioning module 352 commands the target firing module 304 and the transmission control module 194 to transition to that identified possible combination of target firing fraction and gear ratio, respectively.

For example, the transitioning module 352 may set a firing fraction command 356 to the possible target firing fraction of the one of the identified possible combinations, and the firing module 304 sets the target firing fraction 308 to the firing fraction command 356. The transitioning module 352 may also set a gear ratio command 360 to the possible gear ratio of the one of the identified possible combinations, and the transmission control module 194 controls the transmission to operate with the gear ratio command 360. This may include shifting to the gear ratio indicated in the gear ratio command 360 if that gear ratio is not already engaged. Cylinders are therefore activated and deactivated based on the firing fraction command 356, the transmission operates in the gear ratio command 360, and fuel consumption may be decreased.

Figure 4:
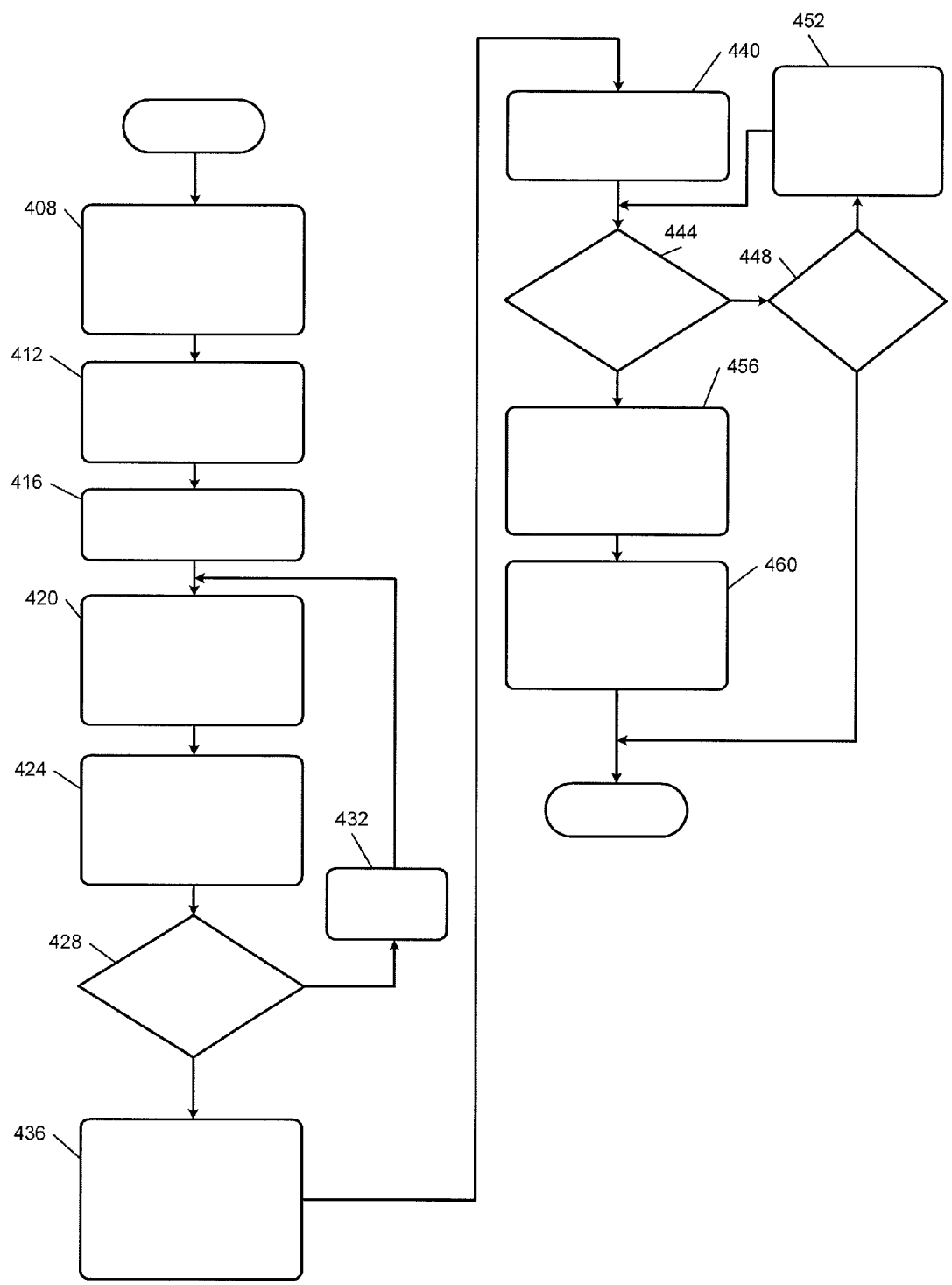
FIG. 4 is a flowchart depicting an example method of controlling cylinder activation/deactivation and transmission gear ratio.

Referring now to FIG. 4, a flowchart depicting an example method of controlling cylinder activation/deactivation in combination with transmission gear ratio is presented. Control begins with 408 where the fueling estimation module 328 determines the estimated fuel consumption 332 for the target firing fraction 308 and the current gear ratio 314 of the transmission. The fueling estimation module 328 determines the estimated fuel consumption 332 based on the target firing fraction 308 and the current gear ratio 314. The fueling estimation module 328 may determine the estimated fuel consumption 332 further based on one or more parameters, such as the torque request 208, the engine speed 312, and/or the vehicle speed 340.

At 412, the combination identification module 344 identifies the other possible combinations 348 of possible target firing fractions and transmission gear ratios. At 416, the fueling estimation module 328 sets a counter value (I) equal to 1. At 420, the fueling estimation module 328 selects the I-th one of the other possible combinations 348. Each of the other possible combinations 348 includes a possible target firing fraction and a possible gear ratio of the transmission.

At 424, the fueling estimation module 328 determines the estimated fuel consumption 332 for the possible target firing fraction and the possible transmission gear ratio of the I-th one of the other possible combinations 348. The fueling estimation module 328 determines the estimated fuel consumption 332 based on the possible target firing fraction and the possible transmission gear ratio. The fueling estimation module 328 may determine the estimated fuel consumption 332 further based on one or more parameters, such as the torque request 208, the engine speed 312, and/or the vehicle speed 340.

At 428, the fueling estimation module determines whether the counter value (I) is less than the total number of other possible combinations identified. If 428 is true, the fueling estimation module 328 increments the counter value (I) at 432 (e.g., sets I=I+1), and control returns to 420. In this manner, an estimated fuel consumption is determined for each of the other possible combinations. If 428 is false, control continues with 436.

At 436, the transitioning module 352 compares the estimated fuel consumption 332 of the target firing fraction 308 and the present gear ratio 314 with the estimated fuel consumptions 332 of the other possible combinations. The transitioning module 352 identifies ones of the other possible combinations having estimated fuel consumptions 332 that are less than the estimated fuel consumption 332 of the target firing fraction 308 and the present gear ratio 314.

At 440, the transitioning module 352 selects one of the other possible combinations that has an estimated fuel consumption 332 that is less than the estimated fuel consumption 332 of the target firing fraction 308 and the present gear ratio 314. For example, the transitioning module 352 may select the one of the other possible combinations with the smallest estimated fuel consumption 332.

The transitioning module 352 determines whether a transition can be made to the selected one of the other possible combinations. An example situation where a transition cannot be made to the selected one of the possible combinations is where a transition from the present gear ratio 314 to the possible target gear ratio of that possible combination cannot be made, such as where one or more other gear ratios are present between the present gear ratio 314 and the possible target gear ratio. In other words, a transition may not be made where two or more gear shifts would be performed to make the transition. This may be indicated, for example, by a difference between the present gear ratio 314 and the possible target gear ratio being greater than a predetermined value.

Another example situation where a transition cannot be made to the selected one of the possible combinations is where a noise and vibration after the transition would be greater than a predetermined value. As such, the transitioning module 352 may determine a noise and vibration value for the selected one of the possible combinations, for example, using a function or a mapping that relates possible target firing fractions and possible target gear ratios to noise and vibration values. Another example situation where a transition cannot be made to the selected one of the possible combinations is where the transition to the possible combination would not allow for a sufficient torque reserve. Yet another example situation where a transition to the selected one of the possible combinations may be avoided is when a period of time of use of the current combination is less than a predetermined period. Another example situation where a transition to the selected one of the possible combinations may be avoided is when a predicted period that the selected one of the possible combinations may be used before transitioning to another possible combination is less than a predetermined period. In these two examples, transitions may be avoided, for example, to prevent frequent transitions and transitions may not be possible in some cases due to the period necessary for other operations (e.g., torque smoothing) to be performed for the transitions. Another example situation where a transition to the selected one of the possible combinations may be avoided is when a fuel efficiency benefit (decrease) achieved via the transition is outweighed by the cost of an increase in torque fluctuations and/or noise and vibration experienced. Other example situations where a transition cannot be made to the selected one of the possible combinations include, but are not limited to, when component durability may decrease if the transition is made.

If 444 is true, control continues with 456. If 444 is false, at 448 the transitioning module 352 determines whether all of the ones of the other possible combinations having estimated fuel consumptions 332 that are less than the estimated fuel consumption 332 of the target firing fraction 308 and the present gear ratio 314 have been addressed for possible use at 444. If 448 is false, the transitioning module 352 selects another one of other possible combinations having estimated fuel consumptions 332 that are less than the estimated fuel consumption 332 of the target firing fraction 308 and the present gear ratio 314 at 452, and control returns to 444. For example, the transitioning module 352 may select the one of the other possible combinations having the next smallest estimated fuel consumption 332 at 452. If 448 is true, control may end.

At 456, when the transitioning module 352 determines that the selected one of the other possible combinations having a lower estimated fuel consumption 332 is useable, the transitioning module 352 sets the firing fraction command 356 and the gear ratio command 360 to the possible target firing fraction and the possible gear ratio of the selected one of the other possible combinations. At 460, the firing module 304 sets the target firing fraction 308 to the firing fraction command 356. Cylinder activation and deactivation is controlled based on the target firing fraction 308. Also at 460, the transmission control module 194 controls the transmission to engage the gear ratio of the gear ratio command 360 if that gear ratio is not already engaged. While the example of FIG. 4 is shown as ending, FIG. 4 may be illustrative of one control loop, and control may perform control loops at predetermined intervals.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs' include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A control system of a vehicle, comprising:
a firing module that determines a target number of activated cylinders of an engine based on a torque request and a present gear ratio of a transmission;
a combination identification module that, based on the torque request, identifies a combination including a possible number of activated cylinders and a possible transmission gear ratio, wherein at least one of:
the possible number of activated cylinders is different than the target number of activated cylinders; and
the possible transmission gear ratio is different than the present gear ratio of the transmission;
a fueling estimation module that determines a first fuel consumption for the target number of activated cylinders and the present gear ratio and that determines a second fuel consumption for the possible number of activated cylinders and the possible transmission gear ratio;
a transitioning module that, when the second fuel consumption is less than the first fuel consumption, selectively:
transitions the target number of activated cylinders to the possible number of activated cylinders; and
transitions a target gear ratio of the transmission to the possible transmission gear ratio; and
an activation/deactivation module that controls cylinder activation and deactivation based on the target number of activated cylinders.

2. The system of claim 1 further comprising a transmission control module that controls the transmission based on the target gear ratio.

3. The system of claim 1 wherein the transitioning module selectively prevents the transitions when a difference between the present gear ratio and the possible transmission gear ratio is greater than a predetermined value.

4. The system of claim 1 wherein the combination identification module identifies the combination including the possible number of activated cylinders and the possible transmission gear ratio further based on a vehicle speed.

5. The system of claim 1 wherein the combination identification module identifies the combination including the possible number of activated cylinders and the possible transmission gear ratio further based on an engine speed.

6. The system of claim 1 wherein the fueling estimation module:

determines the first fuel consumption based on the target number of activated cylinders, the present gear ratio, and the torque request; and determines the second fuel consumption based on the possible number of activated cylinders, the possible transmission gear ratio, and the torque request.

7. The system of claim 6 wherein the fueling estimation module determines the first and second fuel consumptions further based on a vehicle speed and an engine speed.

8. The system of claim 1 wherein the fueling estimation module determines the first and second fuel consumptions using a mapping that relates numbers of activated cylinders and gear ratios to fuel consumptions.

9. The system of claim 1 wherein:
the combination identification module, based on the torque request, further identifies a second combination including a second possible number of activated cylinders and a second possible transmission gear ratio;
at least one of:
the second possible number of activated cylinders is different than the target number of activated cylinders; and
the second possible transmission gear ratio is different than the present gear ratio of the transmission; and
at least one of:
the second possible number of activated cylinders is different than the possible number of activated cylinders; and
the second possible transmission gear ratio is different than the possible transmission gear ratio; and
the fueling estimation module further determines a third fuel consumption for the second possible number of activated cylinders and the second possible transmission gear ratio.

10. The system of claim 9 wherein, when the second fuel consumption is also less than the third fuel consumption, the transitioning module selectively:
transitions the target number of activated cylinders to the possible number of activated cylinders; and
transitions the target gear ratio of the transmission to the possible transmission gear ratio.

11. A control method for a vehicle, comprising:
determining a target number of activated cylinders of an engine based on a torque request and a present gear ratio of a transmission;
based on the torque request, identifying a combination including a possible number of activated cylinders and a possible transmission gear ratio, wherein at least one of:
the possible number of activated cylinders is different than the target number of activated cylinders; and
the possible transmission gear ratio is different than the present gear ratio of the transmission;
determining a first fuel consumption for the target number of activated cylinders and the present gear ratio;
determining a second fuel consumption for the possible number of activated cylinders and the possible transmission gear ratio;
when the second fuel consumption is less than the first fuel consumption, selectively:
transitioning the target number of activated cylinders to the possible number of activated cylinders; and
transitioning a target gear ratio of the transmission to the possible transmission gear ratio; and
controlling cylinder activation and deactivation based on the target number of activated cylinders.

12. The method of claim 11 further comprising controlling the transmission based on the target gear ratio.

13. The method of claim 11 further comprising selectively preventing the transitioning when a difference between the present gear ratio and the possible transmission gear ratio is greater than a predetermined value.

14. The method of claim 11 further comprising identifying the combination including the possible number of activated cylinders and the possible transmission gear ratio further based on a vehicle speed.

15. The method of claim 11 further comprising identifying the combination including the possible number of activated cylinders and the possible transmission gear ratio further based on an engine speed.

16. The method of claim 11 further comprising:
determining the first fuel consumption based on the target number of activated cylinders, the present gear ratio, and the torque request; and
determining the second fuel consumption based on the possible number of activated cylinders, the possible transmission gear ratio, and the torque request.

17. The method of claim 16 further comprising determining the first and second fuel consumptions further based on a vehicle speed and an engine speed.

18. The method of claim 11 further comprising determining the first and second fuel consumptions using a mapping that relates numbers of activated cylinders and gear ratios to fuel consumptions.

19. The method of claim 11 further comprising:
based on the torque request, identifying a second combination including a second possible number of activated cylinders and a second possible transmission gear ratio;
at least one of:
the second possible number of activated cylinders is different than the target number of activated cylinders; and
the second possible transmission gear ratio is different than the present gear ratio of the transmission; and
at least one of:
the second possible number of activated cylinders is different than the possible number of activated cylinders; and
the second possible transmission gear ratio is different than the possible transmission gear ratio; and
determining a third fuel consumption for the second possible number of activated cylinders and the second possible transmission gear ratio.

20. The method of claim 19 further comprising, when the second fuel consumption is also less than the third fuel consumption, selectively:
transitioning the target number of activated cylinders to the possible number of activated cylinders; and
transitioning the target gear ratio of the transmission to the possible transmission gear ratio.

* * * * *